G. A. LYON.
WHEEL TIRE GRIP.
APPLICATION FILED MAY 12, 1911.
1,139,304.
Patented May 11, 1915.
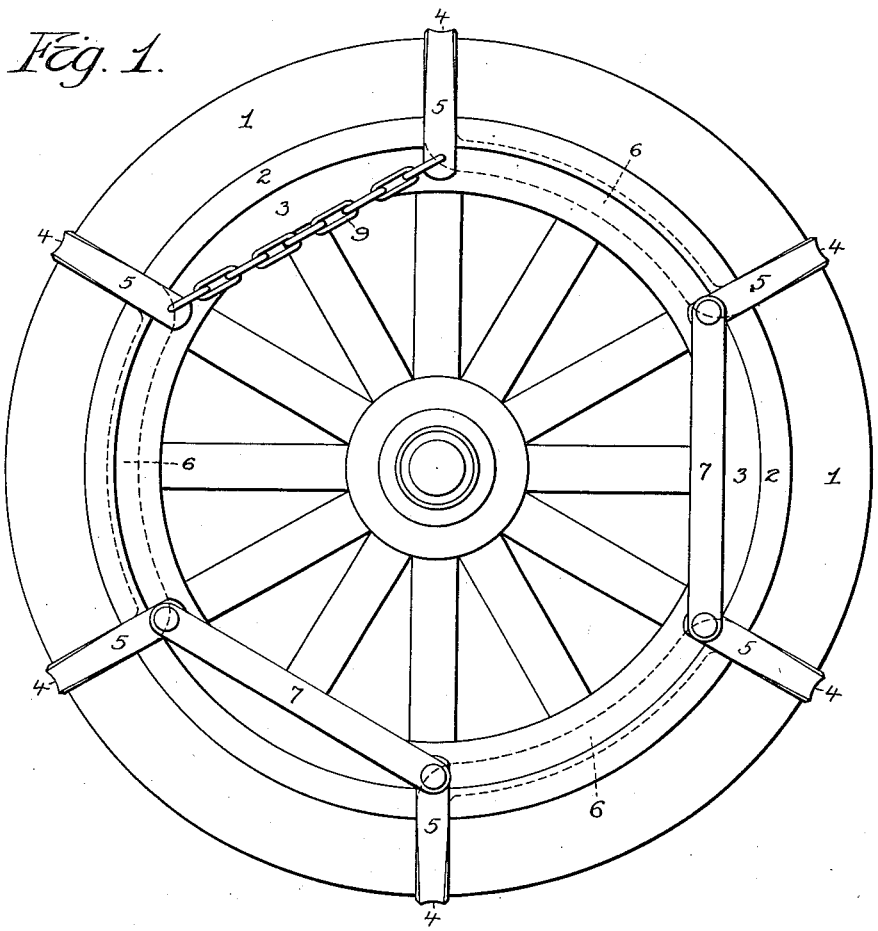
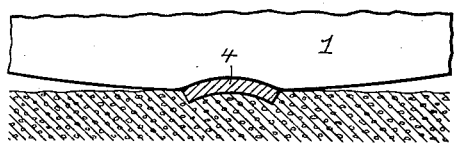
WITNESSES
INVENTOR
GEORGE ALBERT LYON
BY HIS ATTORNEY

UNITED STATES PATENT OFFICE.

GEORGE ALBERT LYON, OF PHILADELPHIA, PENNSYLVANIA.

WHEEL-TIRE GRIP.

1,139,304.   Specification of Letters Patent.   Patented May 11, 1915.

Original application filed October 29, 1909, Serial No. 525,283. Divided and this application filed May 12, 1911. Serial No. 626,756.

*To all whom it may concern:*

Be it known that I, GEORGE ALBERT LYON, a citizen of the United States, residing in Philadelphia, Pennsylvania, have invented certain Improvements in Wheel-Tire Grips, (the same being a division of my application, Serial No. 525,283, filed October 29, 1909,) of which the following is a specification.

My invention consists of certain modifications of or improvements in the non-skidding attachment for wheel tires constituting the subject of my application, Serial No. 499,919, filed June 3, 1909, the object of my present invention being to so construct the tread members of the attachment as to increase their grip both upon the tire and upon the roadway when they are passing between said tire and roadway, and to prevent them from imparting such lift of the tire, under the latter circumstances, as to cause the wheel to jar the vehicle to which it is attached. These objects I attain in the manner hereinafter set forth, reference being had to the accompanying drawing, in which—

Figure 1 is a side elevation of a wheel with my improved tire grip applied thereto, and Fig. 2 is a view of part of the tire as it appears when resting upon the roadway, showing the relation of the tread member of the grip to the tire and roadway under these circumstances.

In Fig. 1 of the drawing, 1 represents the elastic tire of the wheel, usually of the non-pneumatic type, 2 the metal rim, and 3 the wooden felly, all of which may be constructed in accordance with any of the methods now used.

The non-skidding attachment shown in the drawing consists of three sections, each comprising two tread members 4, opposite side members 5, and a member 6 connecting the two side members on one side of the section, the latter being preferably formed in one piece, and the side members of each section on the opposite side of the wheel being connected either by pivoted links 7 or by a chain 9, which can be taken up so as to tighten the attachment upon the wheel.

My present invention does not relate so much to the construction of the sections of the attachment as to the construction of the tread members of said attachment, each of said tread members being cupped or dished with the hollow portion on the exterior of the wheel so that when subjected to pressure between the tire and the roadway, as shown for instance in Fig. 2, the inner surface of the tread member will indent the tire to the greatest extent at the middle of the tread and to the least extent at the edges of the latter, while the grip upon the roadway will be reversed, the indentation being greatest at the edges of the tread member and least at the center of the same. A tread member of this character not only insures a firm grip upon the roadway but also causes such indentation of the tire as will tend to prevent the latter from being lifted clear of the roadway when the tread member is passing between the two, thereby reducing the bumping or jolting which results when the tread member is such that it will not readily indent the roadway and the tire to such an extent as to permit contact between the peripheral surface of the tire and the roadway.

I claim:

1. A tire grip having tread members crossing the tire from side to side and each presenting both on its inner and outer faces reversely angled fore and aft portions, whereby it presents upstanding front and rear edges to the roadway, and a depressed central portion which indents the tire.

2. A tire grip having tread members crossing the tire from side to side, said tread members presenting a concavo-convex cross section with the concave side to the roadway and the convex side to the tire.

In testimony whereof, I have signed my name to this specification, in the presence of two subscribing witnesses.

GEORGE ALBERT LYON.

Witnesses:
 KATE A. BEADLE,
 HAMILTON D. TURNER.